(12) United States Patent
Wang et al.

(10) Patent No.: US 10,642,783 B2
(45) Date of Patent: May 5, 2020

(54) SYSTEM AND METHOD OF USING IN-MEMORY REPLICATED OBJECT TO SUPPORT FILE SERVICES WHEREIN FILE SERVER CONVERTS REQUEST TO BLOCK I/O COMMAND OF FILE HANDLE, REPLICATING SAID BLOCK I/O COMMAND ACROSS PLURAL DISTRIBUTED STORAGE MODULE AND PERFORMING SAID BLOCK I/O COMMAND BY LOCAL STORAGE MODULE

(71) Applicant: VMware, Inc., Palo Alto, CA (US)

(72) Inventors: Wenguang Wang, Santa Clara, CA (US); Eric Knauft, San Francisco, CA (US); Srinath Premachandran, Fremont, CA (US); Zhaohui Guo, Shanghai (CN); Richard P. Spillane, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 15/870,506

(22) Filed: Jan. 12, 2018

(65) Prior Publication Data

US 2019/0220211 A1    Jul. 18, 2019

(51) Int. Cl.
*G06F 16/10* (2019.01)
*G06F 11/08* (2006.01)
*G06F 9/455* (2018.01)

(52) U.S. Cl.
CPC .......... *G06F 16/10* (2019.01); *G06F 9/45558* (2013.01); *G06F 11/08* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 6,854,072 | B1 * | 2/2005 | Cagle | H04L 49/552 |
| | | | | 709/203 |
| 8,103,625 | B1 * | 1/2012 | Pandit | G06F 16/184 |
| | | | | 707/610 |
| 9,378,261 | B1 * | 6/2016 | Bono | G06F 16/275 |
| 2004/0073831 | A1 * | 4/2004 | Yanai | G06F 3/0601 |
| | | | | 714/6.32 |
| 2007/0255926 | A1 * | 11/2007 | Chuang | G06F 16/188 |
| | | | | 711/203 |
| 2016/0063018 | A1 * | 3/2016 | Das | G06F 16/1752 |
| | | | | 707/822 |

* cited by examiner

*Primary Examiner* — William B Partridge
*Assistant Examiner* — Chie Yew
(74) *Attorney, Agent, or Firm* — Patterson + Sheridan, LLP

(57) ABSTRACT

Techniques are disclosed for using in-memory replicated object to support file services. Certain embodiments provide a method of storing persistent file handles in a storage system comprising a plurality of computing devices. The method may include requesting to write a persistent file handle corresponding to a file to a file system stored on the plurality of computing devices. The request may be translated to a block input/output (I/O) command and to an in-memory object, the in-memory object representing at least a portion of the file system, a copy of the in-memory object being stored at each of the plurality of computing devices in volatile memory. The persistent file handle may then be written to the copy of the in-memory object stored in the volatile memory of each of the plurality of computing devices.

20 Claims, 3 Drawing Sheets

SYSTEM AND METHOD OF USING IN-MEMORY REPLICATED OBJECT TO SUPPORT FILE SERVICES WHEREIN FILE SERVER CONVERTS REQUEST TO BLOCK I/O COMMAND OF FILE HANDLE, REPLICATING SAID BLOCK I/O COMMAND ACROSS PLURAL DISTRIBUTED STORAGE MODULE AND PERFORMING SAID BLOCK I/O COMMAND BY LOCAL STORAGE MODULE

BACKGROUND

Enterprise grade storage systems may need to support enterprise grade file services. For example, in a network (e.g., cloud based network, on-premises network, etc.), computing devices (e.g., virtual computing instances (e.g., virtual machines, containers, etc.), physical computing devices, host computers, etc.) may support a network protocol (e.g., Server Message Block (SMB) protocol, iSCSI, etc.) that supports the sharing of data, files, resources, and/or permits authenticated inter-process communication between devices, such as a client and server. Clients may be configured to access files stored in one or more storage devices (e.g., SSD, PCI-based flash storage, SATA, or SAS magnetic disks) of one or more servers using such a network protocol. For example, the clients may issue (e.g., send) commands (open, close, etc.), which also may be referred to herein as file operations, to a server to access files stored on the one or more storage devices. The one or more servers including one or more storage devices may be referred to as a storage system, which may provide file services to clients.

It may be desirable that such a storage system provide transparent failover during upgrade or hardware failure as needed. For example, if a server of the storage system should fail, or not be available for access by clients, such as during an upgrade of the server, transparent failover would allow a client to not incur any service disruption during the unavailability of the server. In particular, the storage system may include a failover cluster including at least two servers, each configured to operate in a file server role and enabled to support continuous availability (e.g., such as in Continuous Availability of SMB3 protocol (SMB3-CA)). The failover cluster, therefore, acts as a clustered file server, and should one of the servers of the failover cluster not be available, the other server(s) of the failover cluster operate as the file server. One or more file shares may be created on the clustered file server and made continuously available to clients.

Accordingly, when a client initially connects to the file share on the clustered file server (e.g., by connecting to one of the servers of the clustered file server), the client determines that the file share has continuous availability enabled. When the client then opens a file on the file share (e.g., on behalf of an application running on the client), the client requests a persistent file handle. A file handle may be a number that is temporarily assigned by the clustered file server to the file when it is opened. The client/clustered file server may then utilize the file handle internally when accessing the file. A persistent file handle is a file handle that is available across each server of the clustered file server. Therefore, should one server go down, the client can still use the persistent file handle for accessing the file over a connection to another server of the clustered file server.

However, the persistent file handle is typically implemented by storing the persistent file handle (e.g., and associated metadata such as a unique key, also referred to as a resume key, supplied by the client) to highly available stable storage (e.g., non-volatile storage such as SSD, PCI-based flash storage, SATA, or SAS magnetic disks which is made highly available using replication/mirroring or erasure coding across servers so that data on the storage is still available when a certain number of servers fail). This highly available stable storage may be referred to as "stable storage" herein. In particular, storage to stable storage ensures that should the server fail, the persistent file handle is recoverable from stable storage, as opposed to being stored in volatile memory (e.g., RAM). Therefore, use of persistent file handles can create large amounts of overhead, which may affect performance of the file service. For example, every file open/close operation performed on the storage system may need to be persisted to stable storage. Accordingly, more efficient systems and techniques for enabling continuous availability in storage systems are desirable.

DETAILED DESCRIPTION

Certain embodiments herein relate to a novel in-memory "virtual storage area network" (vSAN) object. In particular, the in-memory vSAN object may be replicated or use erasure coding across two or more host devices and stored in memory (e.g., volatile memory such as RAM) instead of stable storage at each of the two or more host devices. In certain embodiments, the in-memory vSAN object is used to store persistent file handles. Accordingly, some embodiments of the in-memory vSAN object described herein may be used to support continuous availability of a storage system on top of a software-based vSAN environment. Use of such an in-memory vSAN object may reduce overhead for storing persistent file handles, and may therefore improve performance and throughput of storage systems, thereby improving the functionality of the computing devices that implement the storage systems. In particular, such storage systems may perform file operations more quickly than other systems while still supporting transparent failover and continuous availability because memory has very low latency as compared to stable storage. Further, since the in-memory vSAN object is replicated or use erasure coding across two or more different physical host devices, even if one or more host fails, the persistent file handle may still be available from the other host(s). In addition, file handles are small and therefore may not use a large amount of memory for storage.

It should be noted that though certain embodiments are described with respect to implementing an in-memory vSAN object for supporting continuous availability of a storage system by storing persistent file handles, embodiments of an in-memory vSAN object described herein may be used in other implementations to store other data and for improving other computer functionality. For example, iSCSI protocol also typically stores persistent state information to stable storage. In certain embodiments, such persistent state information according to the iSCSI protocol may instead be stored in an in-memory vSAN object.

Figure 1:
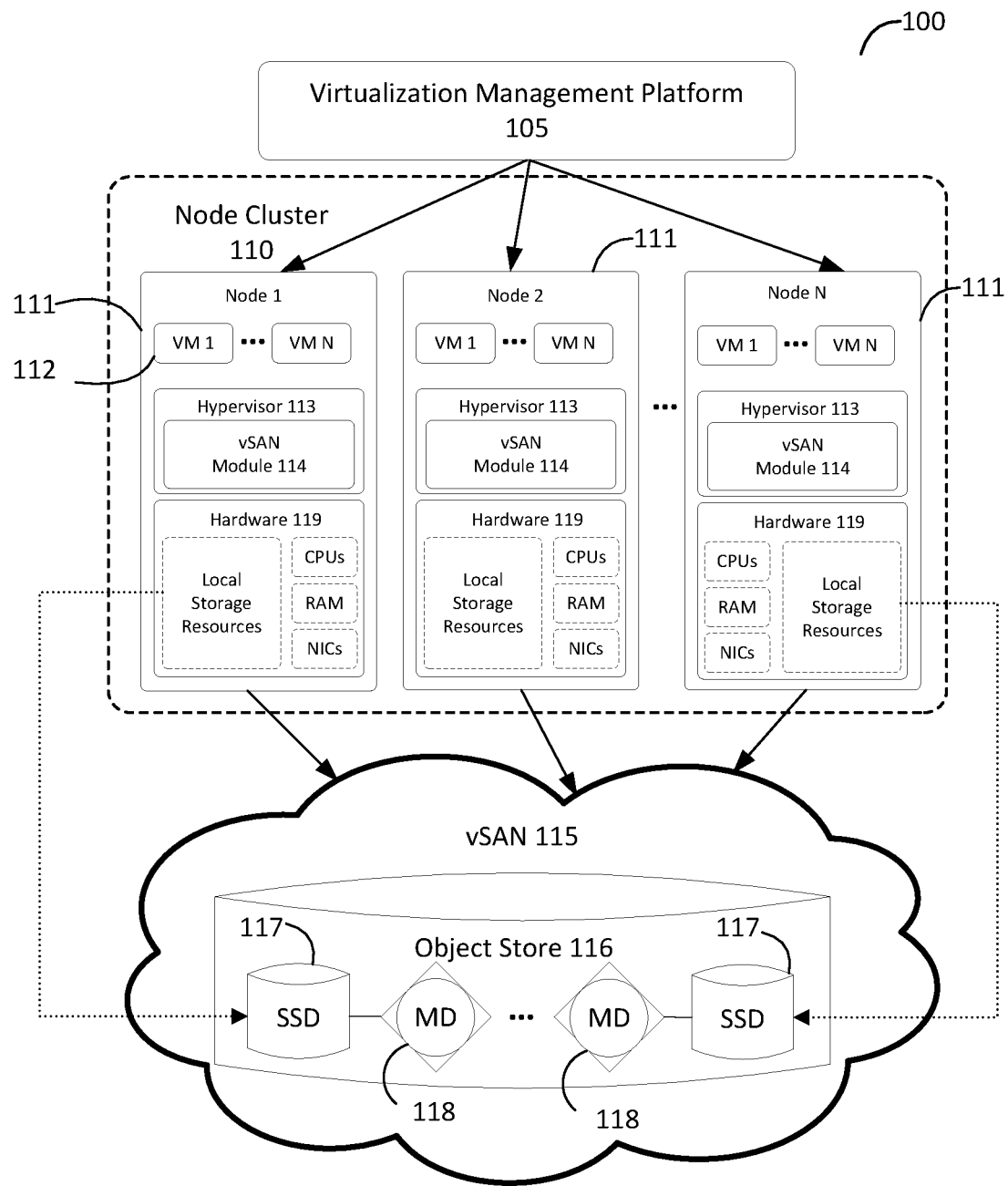
FIG. 1 illustrates an example computing environment in which embodiments may be practiced.

FIG. 1 illustrates a computing environment 100 in which embodiments may be practiced. As shown, computing environment 100 is a software-based vSAN environment that leverages the commodity local storage housed in or directly attached (hereinafter, use of the term "housed" or "housed in" may be used to encompass both housed in or otherwise directly attached) to host devices or nodes 111 of a cluster 110 to provide an aggregate object store 116 to virtual machines (VMs) 112 (or other virtual computing instances) running on the nodes. The local commodity storage housed in or otherwise directly attached to the nodes 111 may include combinations of solid state drives (SSDs) 117 and/or magnetic or spinning disks 118. Accordingly the aggregate object store 116 is an example of a stable storage. In certain embodiments, SSDs 117 serve as a read cache and/or write buffer in front of magnetic disks or SSDs 118 to increase I/O performance. As further discussed below, each node 111 may include a storage management module (referred to herein as a "vSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. As further described below, the vSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a vSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding vSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110.

In one embodiment, vSAN module 114 is implemented as a "vSAN" device driver within hypervisor 113. In such an embodiment, vSAN module 114 provides access to a conceptual "vSAN" 115 through which an administrator can create a number of top-level "device" or namespace objects that are backed by object store 116. For example, during creation of a device object, the administrator specifies a particular file system for the device object (such device objects hereinafter also thus referred to "file system objects") such that, during a boot process, each hypervisor 113 in each node 111 discovers a /vsan/ root node for a conceptual global namespace that is exposed by vSAN module 114. By accessing APIs exposed by vSAN module 114, hypervisor 113 can then determine all the top-level file system objects (or other types of top-level device objects) currently residing in vSAN 115. When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through vSAN 115 may, for example, be implemented to emulate the semantics of a particular file system such as VMware Inc.'s distributed or clustered file system, VMFS, which is designed to provide concurrency control among simultaneously accessing VMs. Because vSAN 115 supports multiple file system objects, it is able provide storage resources through object store 116 without being confined by limitations of any particular clustered file system. For example, many clustered file systems can only scale to support a certain amount of nodes 111. By providing multiple top-level file system object support, vSAN 115 overcomes the scalability limitations of such clustered file systems.

As described with respect to FIG. 2 below, in certain embodiments, the vSAN module 114 includes a local storage object management (LSOM) sub-module and a distributed object management (DOM) sub-module. Using the LSOM and DOM, the vSAN module 114 is configure to create and maintain an in-memory vSAN object (e.g., maintained separately but in synchronized fashion in the memory of each node 111 of node cluster 110). The in-memory vSAN object may be configured to store persistent file handles, as discussed.

Figure 2:
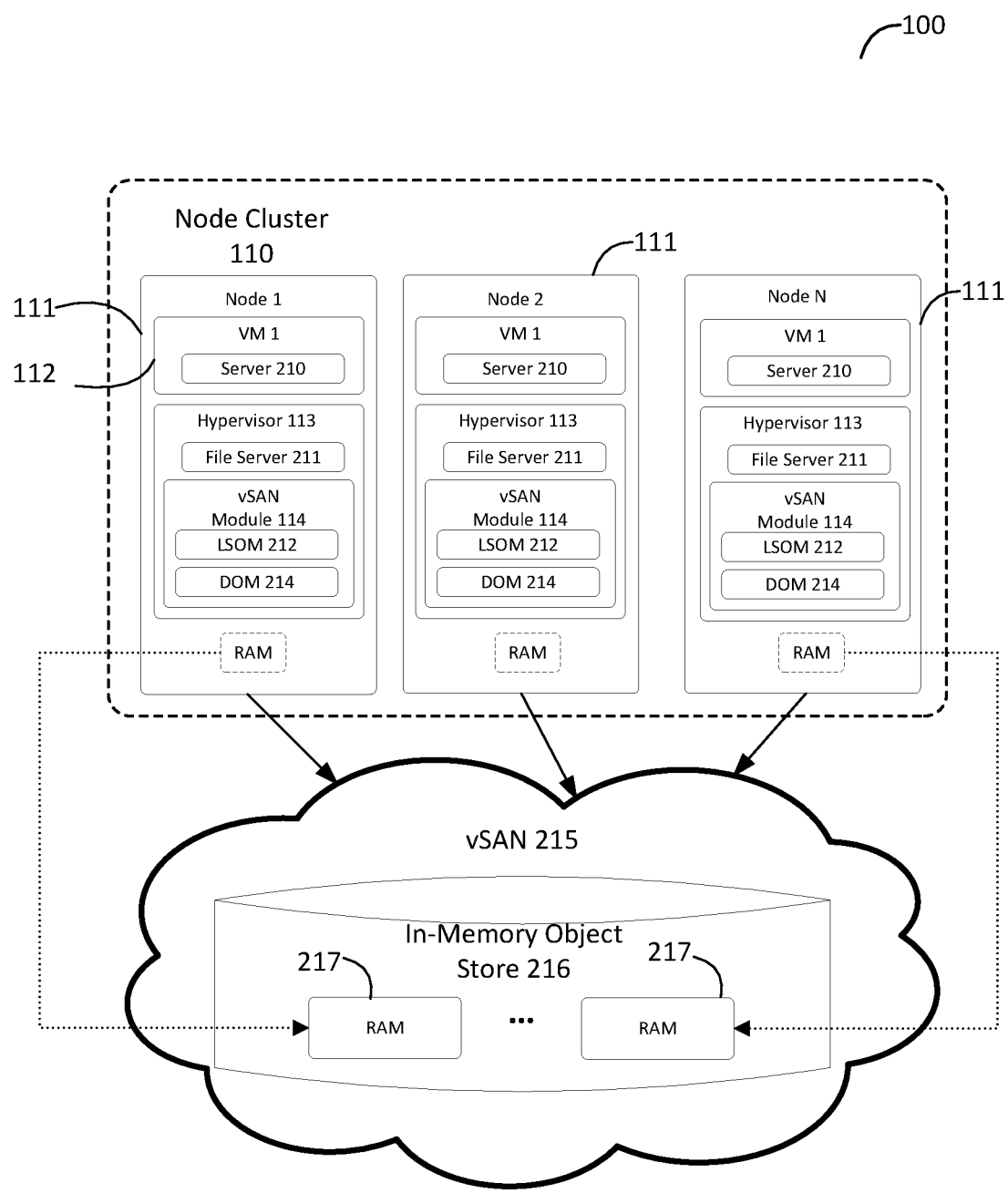
FIG. 2 illustrates an example embodiment of a storage system that supports continuous availability built on top of the computing environment of FIG. 1.

FIG. 2 illustrates an example embodiment of a storage system that supports continuous availability built on top of computing environment 100. Certain components of computing environment 100 shown in FIG. 1 are not shown in FIG. 2 for ease of explanation and visualization.

As shown in FIG. 2, in addition or alternative to the vSAN module 114 providing access to a conceptual vSAN 115 backed by stable storage, vSAN module 114 provides access to a conceptual vSAN 215 backed by physical memory (e.g., RAM) of each node 111. In The vSAN 215 may be used to store persistent file handles for a storage system, as further discussed. In particular, RAM 217 of each node 111 of node cluster 110 provide an aggregated in-memory object store 216. In-memory vSAN objects are stored in the in-memory object store 216, or also may be referred to as stored in vSAN 215.

As shown, each node 111 in node cluster 110 includes a VM 1 running a server 210 (e.g., a file server, such as a SMB file server). Together, the servers 210 on each of the nodes 111 in node cluster 110 may form a clustered file server that supports continuous availability of one or more file shares, as discussed. It should be noted that though three nodes 111 are shown with a single server 210 on each node 111, there may be any number of nodes 111, and any node 111 may include any number of VMs running a server 210. However, overall, there are at least two servers 210. Each server 210 is configured to be accessed by clients (e.g., virtual machines and/or physical machines) (e.g., SMB clients) (not shown).

For example, a client may form a connection with one of the servers 210 on one of the nodes 111 to open a file on a file share on the server 210. Accordingly, the client may request a persistent file handle for the file. The server 210 is then configured to write the persistent file handle into a file system (e.g., a volume of a file system). In the embodiments described herein, the file system for storing persistent file handles is backed by vSAN 215.

In some embodiments, the server 210 is configured to communicate with the hypervisor 113 on the node 111 that includes the server 210. In particular, the hypervisor 113 is configured to run a file system server 211 (e.g., a file server 211) that the server 210 communicates with. Each hypervisor 113 of each node 111 in node cluster 110 may run a file system server 211. Together, the file servers 211 on each of the nodes 111 in node cluster 110 may form a clustered file server that supports continuous availability of one or more file shares, as discussed.

The file server 211 and server 210 may use an appropriate protocol for communication, such as IP or plan9. The server 210, accordingly, may send a file system request to file server 211, such as to write a persistent file handle into a file system. The file server 211 is configured to translate the file system request into block I/O for performance on any block device, such as a vSAN object (e.g., that operates like a virtual disk and corresponding to a volume of the file system) in certain embodiments. The vSAN object, as discussed, may be an in-memory vSAN object stored on physical memory represented by vSAN 215.

For example, the file server 211 sends the block I/O command corresponding to the file system request to write the persistent file handle to the file system (e.g., to a volume of the file system) to vSAN module 114. The vSAN module 114 includes a DOM 214 (DOM sub-module) and a LSOM 212 (LSOM sub-module). The DOM 214 replicates (or uses erasure coding) the block I/O command and sends the block I/O command to each LSOM 212 of each vSAN module 114 on each node 111 in the node cluster 110. Each LSOM 212 on each node 111 in the node cluster 110 then writes the persistent file handle according to the block I/O command to an in-memory vSAN object (corresponding to the volume of the file system) stored in RAM 217 of the node 111 it runs on. Accordingly, each node 111 stores a synchronized copy of the in-memory vSAN object in its local RAM 217. LSOM 212 performs the actual write of the persistent file handle to the copy of the in-memory vSAN object stored in local RAM 217 of its node 111. A DOM 214 receiving the block I/O command ensures that each LSOM 212 in the node cluster 110 performs the write by replicating the block I/O command and sending it (e.g., via a network) to each LSOM 212.

If one of the servers 210 is unavailable, a client may connect (via a network) to another server 210 on another node 111, and the server 210 may access the persistent file handle stored in local RAM 217 of its node 111 via a corresponding file server 211 and vSAN module 114. Accordingly, even if a server 210 fails, the persistent file handle is continuously available. Further, if all the nodes 111 in node cluster 110 fail, though the persistent file handles may be lost due to storage in volatile memory, no actual data loss occurs as the file handles can be recreated by re-opening files. For example, storing persistent file handles to stable storage may not be helpful in this case as disruption is still expected due to temporary unavailability of data.

In certain embodiments, LSOM 212 is configured to determine whether to perform block I/O commands to local RAM 217 of a node 111 (e.g., corresponding to vSAN 215) or to local stable storage of a node 111 (e.g., corresponding to vSAN 115) based on which volume the block I/O command is for. For example, server 210 may be configured to generate all file system requests to write persistent file handles into the same one or more volumes of a file system that may be mapped to one or more in-memory vSAN objects. Accordingly, the corresponding block I/O command generated by the file server 211 will be to the one or more volumes mapped to one or more in-memory vSAN objects. The LSOM 212 will then perform the block I/O command to the one or more in-memory vSAN objects. Other file system requests received by the file server 211 may be to one or more volumes mapped to one or more vSAN objects stored in object store 116 corresponding to vSAN 115 and backed by stable storage. Accordingly, the corresponding block I/O command generated by the file server 211 will be to the one or more volumes mapped to one or more vSAN objects stored in vSAN 115. The LSOM 212 will then perform the block I/O command to the one or more vSAN objects stored in stable storage.

In certain embodiments, LSOM 212 may include separate queues for processing block I/O commands to vSAN objects backed by stable storage (e.g., stored in object store 116) versus in-memory vSAN objects backed by memory (e.g., stored in in-memory object store 216). For example, LSOM 212 may include queues (e.g., first-in-first-out (FIFO) queues) for storing block I/O commands received from DOM 214. Block I/O commands may be processed in FIFO fashion from the queue. LSOM 212 may include one queue for block I/O commands to vSAN objects backed by stable storage and another queue for block I/O commands to in-memory vSAN objects backed by memory. In another embodiment, LSOM 212 may be configured with separate queues for separate volumes corresponding to different vSAN objects. In certain embodiments, the queues for storing block I/O commands to in-memory vSAN objects backed by memory may be higher priority than queues for storing block I/O commands to vSAN objects backed by stable storage. Accordingly, block I/O commands to in-memory vSAN objects may be processed before block I/O commands to vSAN objects backed by stable storage. For example, any block I/O commands stored in a queue for block I/O commands to in-memory vSAN objects may be processed before any block I/O commands stored in a queue for block I/O commands to vSAN objects backed by stable storage. For example, block I/O commands to in-memory vSAN objects may not be written to error logs, while block I/O commands to vSAN objects backed by stable storage may be written to error logs, so block I/O commands to in-memory vSAN objects may have less latency when performed. In some embodiments, there is no queue for storing block I/O commands to in-memory vSAN objects backed by memory and instead such block I/O commands are processed as they are received by LSOM 212.

In certain embodiments, DOM 214 is configured to perform a resync procedure if the node 111 is unavailable for a period of time and later again becomes available (e.g., after failure). For example, while the node 111 is unavailable, the corresponding LSOM 212 may not receive block I/O commands from DOMs 214 on other nodes 111 in the node cluster 110 to update the local copies of the vSAN objects stored at the node 111 (e.g., in-memory and/or stable storage). Therefore, once the node 111 is available again, the DOM 214 at the node 111 may communicate with another DOM 214 on another node 111 to synchronize its local vSAN objects with the vSAN objects at the other node. In some cases, the DOM 214 can perform a partial resync where the DOM 214 only synchronizes data in its local vSAN objects that has been changed since the node 111 was unavailable. For example, where the local vSAN object is stored in stable storage, any data stored in the local vSAN object prior to the node 111 unavailability is still stored in the local stable storage, and only updates to the data need be synchronized. However, where a local vSAN object is an in-memory vSAN object stored in local memory of node 111, any data stored in the in-memory vSAN object prior to the node 111 becoming unavailable may be lost. Accordingly, for in-memory vSAN objects, the DOM 214 may be configured to not perform partial resync and only perform full resync. In a full resync, DOM 214 synchronizes/copies all the data from an in-memory vSAN object stored at another node 111 to the local in-memory vSAN object of its node 111.

Figure 3:
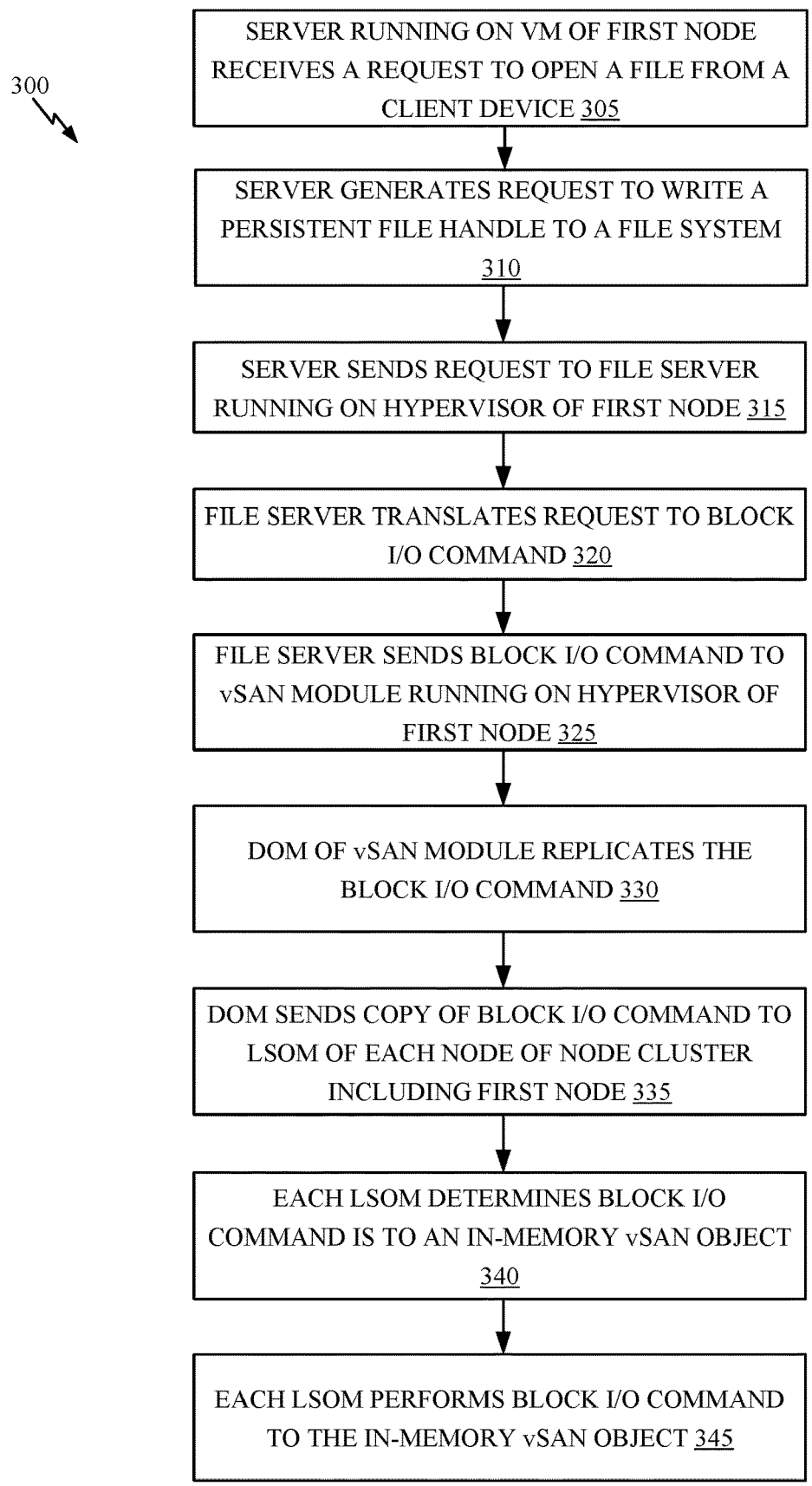
FIG. 3 illustrates operations for storing persistent file handles in an in-memory vSAN object, according to one or more embodiments.

FIG. 3 illustrates operations for storing persistent file handles in an in-memory vSAN object, according to one or more embodiments.

The operations begin at 305 where server 210 running in a VM on a first node 111 receives from a client, over a network, a request to open a file on a file share stored on node cluster 110 operating as a clustered file server. At 310, the server 210 generates a the system request to write a persistent file handle into a file system. In certain embodiments, the request indicates a volume of the file system to write the persistent file handle, the volume being specifically configured to store persistent file handles and be backed by memory instead of stable storage.

At 315, the server 210 sends the request to file server 211 running on hypervisor 113 in the first node 111. At 320, the file server 211 translates the request into one or more block I/O commands for writing the persistent file handle to a block device corresponding to the volume of the file system. In certain embodiments, the block device is an in-memory vSAN object, a copy of which is stored in physical memory (e.g., RAM 217) of each node 111 of node cluster 110, including the first node 111.

At 325, the file server 211 sends the one or more block I/O commands to the vSAN module 114 running on hypervisor 113 in the first node 111. At 330, the DOM 214 of the vSAN module 114 replicates (or uses erasure coding) the one or more block I/O commands into copies of the one or more block I/O commands, one copy for each node 111 of node cluster 110. At 335, DOM 214 sends (e.g., over a network, directly within vSAN module 114, etc.) one copy of the one or more block I/O commands to each LSOM 212 running on each node 111 of node cluster 110.

At 340, each LSOM 212 determines the one or more block I/O commands are to an in-memory vSAN object stored in RAM 217 of the node 111 the LSOM 212 is running on. At 345, each LSOM 212 performs the one or more block I/O commands on the in-memory vSAN object stored in RAM 217 of the node 111 the LSOM 212 is running on, thereby writing the persistent file handle to the in-memory vSAN object stored in RAM 217.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe drive, Persistent Memory Device, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims

We claim:

1. A method of storing persistent file handles in a storage system comprising a plurality of computing devices, comprising:

receiving, at a server, a request to open a file, a copy of the file being stored on each of a plurality of storage devices each connected to or housed in at least one of the plurality of computing devices, wherein the server is running in a virtual computing instance that is running on a first computing device of the plurality of computing devices;

generating, by the server, a request to write a persistent file handle corresponding to the file to a file system stored on the plurality of computing devices;

sending the request from the server to a file server running on the first computing device;

translating, by the file server, the request to a block input/output (I/O) command directed to an in-memory object, the in-memory object representing at least a portion of the file system, a copy of the in-memory object being stored at each of the plurality of computing devices in volatile memory;

sending, by the file server, the block I/O command to a distributed storage module executed by at least one processor of the first computing device;

replicating, by the distributed storage module, the block I/O command;

sending, by the distributed storage module, a copy of the block I/O command to a local storage module on each of the plurality of computing devices, each local storage module executed by at least one processor of the corresponding one of the plurality of computing devices; and performing, by the local storage module on the first computing device, the block I/O command to write the persistent file handle to a first copy of the in-memory object stored in the volatile memory of the first computing device.

2. The method of claim 1, wherein each copy of the in-memory object represents a first volume of the file system, wherein a copy of a storage object is stored at each of the plurality of storage devices, wherein each copy of the storage object represents a second volume of the file system, and further comprising:

receiving, by the local storage module on the first computing device, a second block I/O command to write data to a first copy of the storage object stored in one of the plurality of storage devices connected to or housed in the first computing device, the one of the plurality of storage devices comprising a non-volatile storage; and performing, by the local storage module on the first computing device, the second block I/O command to write the data to the first copy of the storage object.

3. The method of claim 2, further comprising:

maintaining, by the local storage module on the first computing device, a first queue for block I/O commands to the first volume and a second queue for block I/O commands to the second volume; and performing block I/O commands in the first queue at a higher priority than block I/O commands in the second queue.

4. The method of claim 1, wherein the persistent file handle is never written to a non-volatile storage of the first computing device.

5. The method of claim 1, wherein the first computing device becomes unavailable for a period of time and again becomes available after the period of time, and further comprising:

performing, by the distributed storage module, a full resync of the first copy of the in-memory object stored in the volatile memory of the first computing device after the period of time by copying all data corresponding to at least one copy of the in-memory object from at least a second computing device of the plurality of computing devices.

6. The method of claim 5, wherein each copy of the in-memory object represents a first volume of the file system, wherein a copy of a storage object is stored at each of the plurality of storage devices, wherein each copy of the storage object represents a second volume of the file system, and further comprising:

performing, by the distributed storage module, a partial resync of a first copy of the storage object stored in one of the plurality of storage devices connected to or housed in the first computing device after the period of time by copying any data updated during the period of time corresponding to at least one copy of the storage object from at least a second one of the plurality of storage devices, the one of the plurality of storage devices comprising a non-volatile storage.

7. The method of claim 1, wherein the in-memory object is a virtual storage network object of a virtual storage network.

8. A non-transitory computer readable medium comprising instructions to be executed in a computer system, wherein the instructions when executed in the computer system perform a method of storing persistent file handles in a storage system comprising a plurality of computing devices, the method comprising:

receiving, at a server, a request to open a file, a copy of the file being stored on each of a plurality of storage devices each connected to or housed in at least one of the plurality of computing devices, wherein the server is running in a virtual computing instance that is running on a first computing device of the plurality of computing devices;

generating, by the server, a request to write a persistent file handle corresponding to the file to a file system stored on the plurality of computing devices;

sending the request from the server to a file server running on the first computing device;

translating, by the file server, the request to a block input/output (I/O) command directed to an in-memory object, the in-memory object representing at least a portion of the file system, a copy of the in-memory object being stored at each of the plurality of computing devices in volatile memory;

sending, by the file server, the block I/O command to a distributed storage module executed by at least one processor of the first computing device;

replicating, by the distributed storage module, the block I/O command;

sending, by the distributed storage module, a copy of the block I/O command to a local storage module on each of the plurality of computing devices, each local storage module executed by at least one processor of the corresponding one of the plurality of computing devices; and performing, by the local storage module on the first computing device, the block I/O command to write the persistent file handle to a first copy of the in-memory object stored in the volatile memory of the first computing device.

9. The non-transitory computer readable medium of claim 8, wherein each copy of the in-memory object represents a first volume of the file system, wherein a copy of a storage object is stored at each of the plurality of storage devices, wherein each copy of the storage object represents a second volume of the file system, and wherein the method further comprises:

receiving, by the local storage module on the first computing device, a second block I/O command to write data to a first copy of the storage object stored in one of the plurality of storage devices connected to or housed in the first computing device, the one of the plurality of storage devices comprising a non-volatile storage; and performing, by the local storage module on the first computing device, the second block I/O command to write the data to the first copy of the storage object.

10. The non-transitory computer readable medium of claim 9, wherein the method further comprises:

maintaining, by the local storage module on the first computing device, a first queue for block I/O commands to the first volume and a second queue for block I/O commands to the second volume; and performing block I/O commands in the first queue at a higher priority than block I/O commands in the second queue.

11. The non-transitory computer readable medium of claim 8, wherein the persistent file handle is never written to a non-volatile storage of the first computing device.

12. The non-transitory computer readable medium of claim 8, wherein the first computing device becomes unavailable for a period of time and again becomes available after the period of time, and wherein the method further comprises:

performing, by the distributed storage module, a full resync of the first copy of the in-memory object stored in the volatile memory of the first computing device after the period of time by copying all data corresponding to at least one copy of the in-memory object from at least a second computing device of the plurality of computing devices.

13. The non-transitory computer readable medium of claim 12, wherein each copy of the in-memory object represents a first volume of the file system, wherein a copy of a storage object is stored at each of the plurality of storage devices, wherein each copy of the storage object represents a second volume of the file system, and wherein the method further comprises:

performing, by the distributed storage module, a partial resync of a first copy of the storage object stored in one of the plurality of storage devices connected to or housed in the first computing device after the period of time by copying any data updated during the period of time corresponding to at least one copy of the storage object from at least a second one of the plurality of storage devices, the one of the plurality of storage devices comprising a non-volatile storage.

14. The non-transitory computer readable medium of claim 8, wherein the in-memory object is a virtual storage network object of a virtual storage network.

15. A computer system, wherein system software for the computer system is programmed to execute a method of storing persistent file handles in a storage system comprising a plurality of computing devices, the method comprising:

receiving, at a server, a request to open a file, a copy of the file being stored on each of a plurality of storage devices each connected to or housed in at least one of the plurality of computing devices, wherein the server is running in a virtual computing instance that is running on a first computing device of the plurality of computing devices;

generating, by the server, a request to write a persistent file handle corresponding to the file to a file system stored on the plurality of computing devices;

sending the request from the server to a file server running on the first computing device;

translating, by the file server, the request to a block input/output (I/O) command directed to an in-memory object, the in-memory object representing at least a portion of the file system, a copy of the in-memory object being stored at each of the plurality of computing devices in volatile memory;

sending, by the file server, the block I/O command to a distributed storage module executed by at least one processor of the first computing device;

replicating, by the distributed storage module, the block I/O command;

sending, by the distributed storage module, a copy of the block I/O command to a local storage module on each of the plurality of computing devices, each local storage module executed by at least one processor of the corresponding one of the plurality of computing devices; and performing, by the local storage module on the first computing device, the block I/O command to write the persistent file handle to a first copy of the in-memory object stored in the volatile memory of the first computing device.

16. The computer system of claim 15, wherein each copy of the in-memory object represents a first volume of the file system, wherein a copy of a storage object is stored at each of the plurality storage devices, wherein each copy of the storage object represents a second volume of the file system, and wherein the method further comprises:

receiving, by the local storage module on the first computing device, a second block I/O command to write data to a first copy of the storage object stored in one of the plurality of storage devices connected to or housed in the first computing device, the one of the plurality of storage devices comprising a non-volatile storage; and performing, by the local storage module on the first computing device, the second block I/O command to write the data to the first copy of the storage object.

17. The computer system of claim 16, wherein the method further comprises:

maintaining, by the local storage module on the first computing device, a first queue for block I/O commands to the first volume and a second queue for block I/O commands to the second volume; and performing block I/O commands in the first queue at a higher priority than block I/O commands in the second queue.

18. The computer system of claim 15, wherein the persistent file handle is never written to a non-volatile storage of the first computing device.

19. The computer system of claim 15, wherein the first computing device becomes unavailable for a period of time and again becomes available after the period of time, and wherein the method further comprises:

performing, by the distributed storage module, a full resync of the first copy of the in-memory object stored in the volatile memory of the first computing device after the period of time by copying all data corresponding to at least one copy of the in-memory object from at least a second computing device of the plurality of computing devices.

20. The computer system of claim 15, wherein the in-memory object is a virtual storage network object of a virtual storage network.

\* \* \* \* \*